United States Patent [19]

Pitot et al.

[11] Patent Number: 5,701,315

[45] Date of Patent: Dec. 23, 1997

[54] METHOD AND DEVICE FOR PROTECTING THE EXECUTION OF LINEAR SEQUENCES OF COMMANDS PERFORMED BY A PROCESSOR

[75] Inventors: Christian Pitot, Boulogne; Martinez Michel, Martignas sur Jalle, both of France

[73] Assignee: Sextant Avionique, Meudon la Foret, France

[21] Appl. No.: 504,113

[22] Filed: Jul. 19, 1995

[30] Foreign Application Priority Data

Jul. 27, 1994 [FR] France .................. 94 09284

[51] Int. Cl.$^6$ .................................. G11C 29/00
[52] U.S. Cl. ............. 371/51.1; 371/49.1; 364/266.3; 364/945.6
[58] Field of Search .................. 371/51.1, 49.1, 371/49.4, 50.1, 25.1, 37.1, 67.1, 69.1; 395/185.01, 185.07; 364/265, 265.3, 266.3, 945.6

[56] References Cited

U.S. PATENT DOCUMENTS

| | | | |
|---|---|---|---|
| 3,585,378 | 6/1971 | Bouricius | 371/51.1 |
| 4,074,229 | 2/1978 | Prey | |
| 4,108,359 | 8/1978 | Proto | |
| 4,692,893 | 9/1987 | Casper | 371/51.1 |
| 4,811,347 | 3/1989 | Bolt | 371/51.1 |
| 5,392,302 | 2/1995 | Kemp et al. | 371/51.1 |

OTHER PUBLICATIONS

IBM Technical Disclosure Bulletin, vol. 21, No. 6, Nov. 1978.

Primary Examiner—Robert W. Beausoliel, Jr.
Assistant Examiner—Trinh L. Tu
Attorney, Agent, or Firm—Browdy and Neimark

[57] ABSTRACT

A method for detecting errors in a linear sequence of commands executed by a processor and stored in a memory at a predetermined start address, comprises the association of each word in the sequence to a bit of the start address. Before storing each sequence word into the memory, the method determines the value of an unused bit of the word so that the value of the associated bit of the start address will be equal to the result of a predetermined function applied to the bits of the word. When reading a sequence word in said memory, the method compares the result of said function applied to the bits of the word read, with the value of the associated bit of the start address, and transmits an error signal if a difference is detected.

5 Claims, 1 Drawing Sheet

METHOD AND DEVICE FOR PROTECTING THE EXECUTION OF LINEAR SEQUENCES OF COMMANDS PERFORMED BY A PROCESSOR

BACKGROUND OF THE INVENTION

1. Field of the Invention

This invention relates to a device for controlling the execution of linear sequences of instructions performed by a processor.

It applies notably, though not exclusively, to the devices for displaying graphical information enabling e.g. vehicles to be driven.

2. Description of the Prior Art

Generally, such devices comprise a processor, memories and a viewing screen and use predefined sequences of information or instructions, constituting patterns to be viewed, stored in read-only memories.

In order to be viewed, these sequences of information or instructions, which are each marked by a start address, must be performed in order to cause the writing of the corresponding pattern in the image memory of the device.

It so happens that, in the context of the driving of vehicles, the displaying of erroneous information can, if it is not detected, lead to potentially catastrophic interpretations.

OBJECT OF THE INVENTION

The main object of this invention is to detect plotting sequence improbabilities susceptible of revealing such a malfunction.

SUMMARY OF THE INVENTION

Accordingly, there is provided a method of detecting errors in the execution of a linear sequence of commands performed by a processor and stored in a memory at a predetermined start address expressed in the form of a binary word comprising a predetermined number of bits, said sequence comprising a series of binary words each comprising at least one bit not used in the coding of the commands of the sequence, said method comprising:

- the associating of each word in the sequence with a bit of the address word so that the order of the words in the sequence corresponds to a predetermined order of the bits in the address word,
- during storage of the sequence in the memory, the determining, for each word in the sequence, of the value of the unused bit in order for the value of the associated bit of the address word to be equal to the result of a predetermined function applied to the bits of the word in the sequence, and
- during reading in the memory of a word from the sequence, the searching for the associated bit of the sequence start address word by means of the rank of the word read in the sequence, the comparing of the result of said function applied to the bits of the word read with the value of the associated bit of the address word, and the transmission of an error signal if the comparison reveals a difference.

In this way, the sequencing of the reading of the words in the sequence and the value of the words read are controlled simultaneously.

Advantageously, the function applied to the bits of the words in the sequence is of the parity calculation type, thereby enabling all the bits of the words read to be checked globally.

BRIEF DESCRIPTION OF THE DRAWINGS

Further features and advantages of the invention will be apparent from an embodiment of the invention described, by way of a non-limiting example, in reference to the corresponding accompanying drawings in which.

DESCRIPTION OF THE PREFERRED EMBODIMENT

Figure 1:
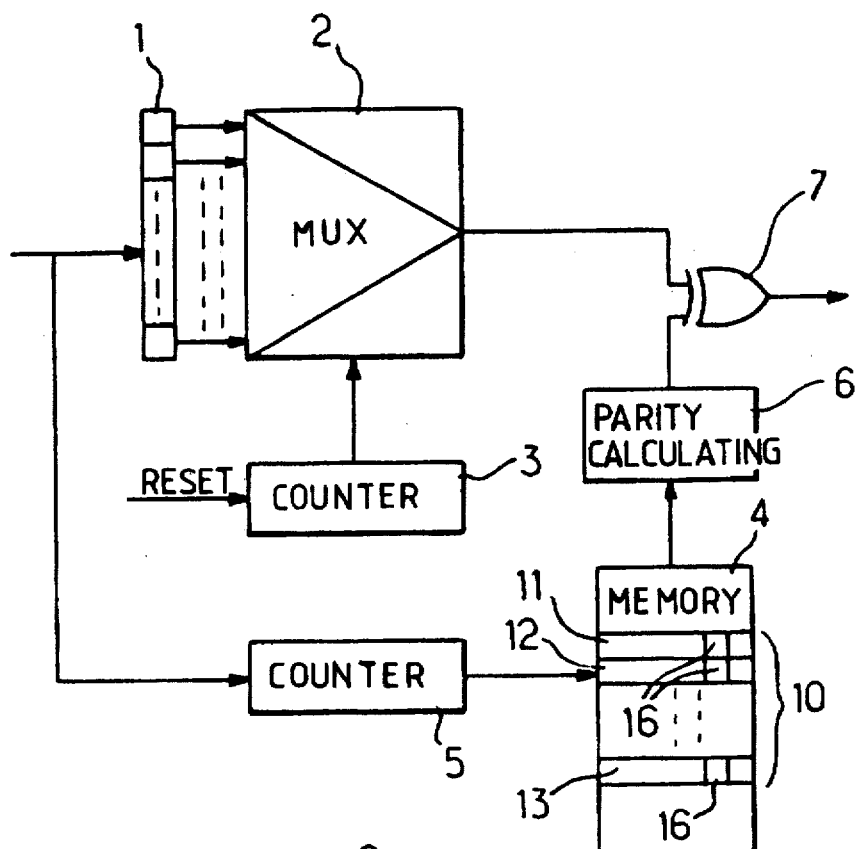
FIG. 1 is a schematic representation of an error detecting device embodying the method according to the invention.

The error detecting device represented in FIG. 1 comprises a register 1 coupled with a multiplexer 2, the latter being controlled by a counter 3 which enables a bit of the word contained in the register 1 to be selected as a function of the value of the counter 3.

This register 1 is intended to receive the binary address of the first word 11 of a linear sequence 10 of instructions to be performed by a processor, said sequence being stored in a memory 4.

The binary word 12 read in the memory 4 at the address supplied by a counter 5 is processed by a circuit, e.g. a parity detecting circuit, of which the output is connected to the input of an XOR gate 7 used as a binary comparator. Furthermore, the output of the multiplexer 2 is connected to another input of the XOR gate 7 of which the output supplies an error signal if the two inputs are not at the same logic level.

When performance of the sequence 10 is initiated, the processor loads the binary address of the start of the sequence 10 into the register 1 and into the memory 4 read counter 5, and initializes the counter 3 at zero.

Thus, the multiplexer is controlled so as to select the bit of rank 1 according to a predetermined order of the register 1, while the first word of the sequence 10 is read. If the parity of this word differs from the value of the first bit of the start address of the sequence, an error signal is obtained at output of the XOR gate 7. In this example, the error signal is active in the logic "1" state.

During the following stage, the two counters 3 and 5 are incremented, thereby causing selection of the second bit of the start address of the sequence 10 in the predefined order and the reading of the second word in the memory 4, and therefore the comparison, by the XOR gate 7, of the parity of the second word with the second bit of the start address. These operations are repeated up to the last word 13 of the sequence 10, the counters 3 and 5 being incremented when the next word in the sequence 10 is read. Furthermore, the counter 3 is zeroized every time it reaches the value of the number of bits in the address word, in order to cyclically select each of the bits in the register 1. Thus, each of the bits of the sequence start address word is associated with the word in the sequence having a modulo-n rank equal to the rank of the address word bit, n being the number of bits in the address word.

The coinciding of the parities of the words in the sequence and the values of the bits corresponding to the sequence start address is ensured by the presence of an unused bit 16 in each word of the sequence. This unused bit 16 is positioned, at the time of storing the sequence 10 in the memory 4, at a value such that this coinciding is obtained.

This device thus makes it possible to check that all the words in the sequence have indeed been read, in compliance with their order in the sequence. Furthermore, if the parity of a word is determined by means of all the bits in the word, this device also enables the value of each word to be checked.

Figure 2:
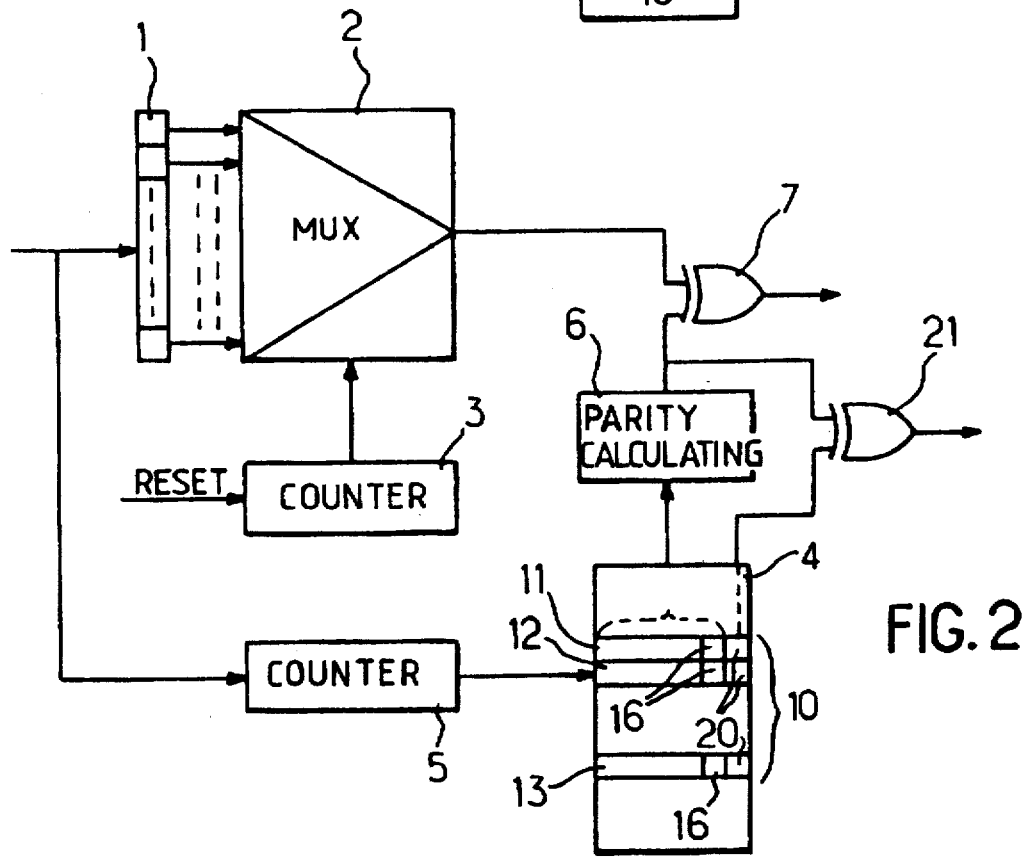
FIG. 2 is a schematic representation of an error detecting device according to a second embodiment.

According to the embodiment of the invention represented in FIG. 2, each word 11, 12, 13 in the sequence 10 comprises a second bit that is not used for the coding of the plotting instructions, but that is used in the checking of the sequencing previously described in order to memorize the parity of the word. The value of this bit 20 is compared, by means of a second XOR gate 21, e.g. with the value supplied by the parity calculating circuit 6. The second XOR gate 21 thus issues a second error signal if the logic levels of the signals at input are different.

In this manner, if the parity (exclusive of bit 20) of the word read in the memory 4 corresponds to the value of the bit 20 of this same word and if the XOR gate 7 issues an error signal, there has been an error in the sequencing of the performance of the sequence 10. Conversely, if the XOR gate 21 issues an error signal, this indicates a parity error of the word read and therefore that this word has an incorrect value.

This arrangement thus enables a distinction to be made between the sequencing errors indicated by the first XOR gate 7 and the read or write errors indicated by the second XOR gate 21.

We claim:

1. A method for detecting errors during execution by a processor of a linear sequence of binary coded commands stored in an addressable memory from a predetermined binary start address comprising a predetermined number of bits each having a rank in said start address, said sequence comprising a series of binary command words each having a rank in said sequence and comprising a predetermined number of bits including at least one unused bit at a predetermined rank in said command word, each of said bits having a respective value, said method comprising:

a storage phase of each command word of said sequence in said memory from said start address, comprising the steps of: (i) determining for said command word the rank of a start address bit in said start address to associate to said command word, by applying a first calculation function to the rank of said command word in said sequence, (ii) determining a value of the unused bit of said command word so that a value of the start address bit associated to said command word is equal to a result of a second calculation function applied to the respective values of the bits of said command word including said unused bit, (iii) updating the value of the unused bit in said command word, and (iv) storing said command word in said memory, a reading phase of each command word from said sequence in said memory, comprising the steps of: (i) reading said command word in said memory, (ii) determining in said start address the bit associated to the read command word by applying said first calculation function to the rank of said command word read in said sequence, said first calculation function providing the rank of the associated bit in said start address, (iii) applying said second calculation function to the bits of said read command word so as to obtain a bit value, (iv) comparing said bit value obtained by said second calculation function with the value of the bit of said start address associated to said read word, and (v) transmitting a read error signal if the comparison reveals a difference.

2. The method as claimed in claim 1, wherein said second calculation function is a parity calculation function.

3. The method as claimed in claim 1, wherein said first calculation function is a modulo-n calculation function, n being the number of bits in said start address.

4. A device for detecting errors during execution by a processor of a linear sequence of binary coded commands stored in an addressable memory from a predetermined binary start address comprising a predetermined number n of bits each having a rank in said start address, said sequence comprising a series of binary command words each having a predetermined rank in said sequence corresponding to a predetermined address in said memory, each of said command words comprising a predetermined number of bits including at least one unused bit at a predetermined rank in said command word, said unused bit of each command word having a value such that a parity of said command word is equal to a value of a bit of said start address having a rank equal to a result of a modulo-n function applied to the rank of said word in said sequence, said device comprising:

a register containing said start address and coupled with a multiplexer controlled by a first counter zeroized every time said counter reaches said number n, said multiplexer enabling a bit of said start address contained in said register to be selected as a function of the value of said first counter, a second counter having a value initialized at a value of the start address, which determines the address of the word to be read in said memory, said first and second counters being simultaneously incremented so that the first counter contains the rank of the start address bit associated to the command word addressed by said second counter, a parity calculating circuit coupled with said memory for calculating a parity of the command word in said sequence, which has an address corresponding to the value of said second counter, an XOR gate receiving as input a first signal from said parity calculating circuit and a second signal from said multiplexer, and supplying a read error signal if respective logic levels of said first and second signals are different.

5. The device as claimed in claim 4, further comprising a second XOR gate which compares said first signal supplied by said parity calculating circuit with a value of a second unused bit of each word read in the memory, this second unused bit memorizing a parity of a useful part of the word, said second XOR gate having an output providing an error signal if the calculated parity of said read word differs from the parity memorized in said second unused bit.

* * * * *